Feb. 21, 1956 L. A. MOULTON 2,735,193
READING TRAINING DEVICE
Filed Sept. 16, 1950
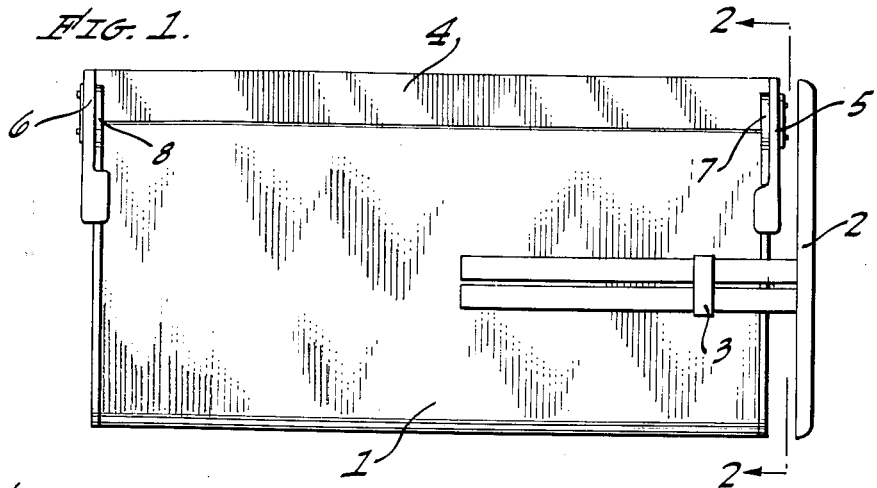
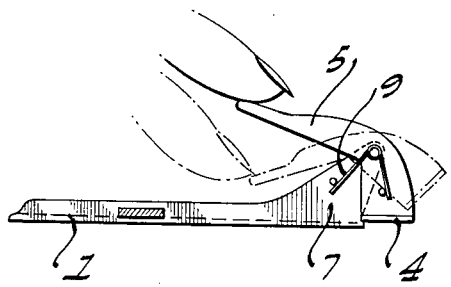
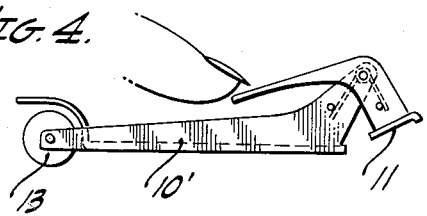
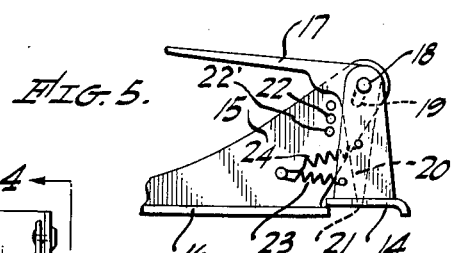
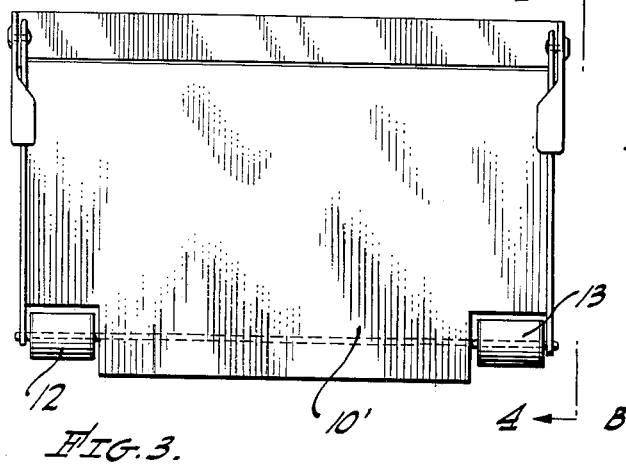
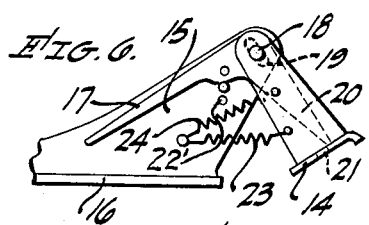
INVENTOR.
LEE A. MOULTON,
BY
ATTORNEY.

United States Patent Office 2,735,193
Patented Feb. 21, 1956

2,735,193

READING TRAINING DEVICE

Lee A. Moulton, Redondo Beach, Calif.

Application September 16, 1950, Serial No. 185,237

10 Claims. (Cl. 35—35)

This invention relates to a reading training device or flash reader for the purpose of increasing the reading rate or the rapidity with which material is read by the user of the device.

An object of my invention is to expose and cover reading matter, line by line, and to cover and uncover the lines of reading matter with sufficient rapidity so that the user is required to read an entire line or more at a time.

Another object of my invention is to provide a novel reading training device in which a shutter is manually actuated by the user, this shutter being so constructed and arranged that it will uncover a line or more of reading matter in one position, and cover that line or more of reading matter in another position thereof.

Still another object of my invention is to provide a reading training device, which is simple in construction, inexpensive to manufacture, and which can be easily used on any page of printed matter.

A feature of my invention resides in the operation of the shutter, this operation being either manual or automatic, particularly with relation to the movement of the shutter from open to closed position.

Other objects, advantages and features of invention may appear from the accompanying drawing, the subjoined detailed description and the appended claims.

In the drawing:

Figure 1 is a top plan view of my reading device.

Figure 2 is a side elevation of the same taken from line 2—2 of Figure 1.

Figure 3 is a top plan view of a modified form of reading device.

Figure 4 is a side elevation taken from line 4—4 of Figure 3.

Figure 5 is a fragmentary side elevation of a reading device, showing a modified form of shutter actuating means.

Figure 6 is a fragmentary side elevation of the reading device shown in Fig. 5, with the shutter lifted.

Referring more particularly to the drawing, the numeral 1 indicates a substantially rectangular plate of sufficient width to cover the entire sheet of reading material, and also covering a substantial part of the page of reading material. A T-square 2 is slidably mounted on the plate 1, and this T-square engages the side of the book or page to properly align the plate 1 on this page. The T-square 2 is slidable through a strap 3 on the top of the plate 1.

A shutter 4, also rectangular, is mounted on the upper edge of the plate 1, substantially as shown. This shutter is pivotally attached to the plate 1 by a pair of fingers 5—6 on each end thereof. These fingers are pivotally secured to ears 7—8, respectively, on each side of the plate 1. Springs 9 engage the fingers 5—6 to urge the shutter 4 to closed position, that is, to the position where a line of reading matter is covered. The fingers 5—6 are sufficiently extended so that the operator can flick these fingers in using the device, substantially as shown. In other words, the fingers 5—6 can be depressed, thus swinging the shutter 4 upwardly and exposing a line or more of reading material. By releasing the finger, the shutter 4 will automatically return to horizontal postion and cover the line of reading matter. While I have shown the fingers, 5 and 6, it is evident that, if desired, only one operating finger can be employed.

In the form of my invention shown in Figures 3 and 4, the plate 10' is similar in shape and general construction to the plate 1, previously described. The shutter 11 is similar to the shutter 4 and is operated in the same manner as previously described for the shutter 4. The method of aligning the plate 10' is different, however, in that I provide a pair of rollers 12—13 at the rear of the plate 10 and one on each side thereof. These rollers are preferably rubber covered and they act to properly maintain alignment of the plate 10 and prevent it from tilting relative to the sheet of material upon which it is placed, once the alignment is effected by the user when the training device is placed on the printed sheet.

In Figures 5 and 6, inclusive, I have shown a different means of actuating the shutter plate and, as shown in these figures, the shutter plate is swung outwardly to expose a line of type, but is retracted to cover the line automatically when the trigger finger is depressed a certain amount.

Considering first Figures 5 and 6, the shutter 14 is pivotally mounted on pins 18 fixed to ears 15 which project upwardly from the plate 16. A bell crank 17 is also pivotally mounted on the ears 15 by means of the pin 18. The bell crank 17 is disposed between an ear 15 and one bail arm of the shutter 14 and is mounted on pin 18 by a slot 19 formed at its vortex. A terminal end 20 is formed on the bell crank 17, and this terminal end enters a hole 21 in the shutter 14. When the bell crank 17 is depressed, it strikes a pin 22 projecting from the ear 15, which causes the terminal end to be raised out of the hole 21. This releases the shutter 14 and the spring 23 returns the shutter to closed position. The bell crank 17 is returned to its original position to again engage the shutter 14 by the spring 24. The pin 22 can be mounted in any of the holes 22' to adjust the tripping position of the bell crank 17.

Having described my invention, I claim:

1. A reading training device comprising a plate, a shutter extending along one edge of said plate, and forming an extension of the plate, means pivotally mounting said shutter on the plate for tilting movement relative to the plate to frame an elongated aperture with the edge of the plate, trigger means operably engaging the shutter to tilt said shutter on said pivotal mounting away from the plate, and spring means engaging the shutter to return said shutter to engagement with said one edge of the plate.

2. A reading training device comprising a plate, a shutter extending along one edge of said plate, and forming an extension of the plate, means pivotally mounting said shutter on the plate for tilting movement relative to the plate to frame an elongated aperture with the edge of the plate, trigger means operably engaging the shutter to tilt said shutter on said pivotal mounting away from the plate, and means engaging the shutter to return said shutter to engagement with said one edge of the plate.

3. A reading training device comprising a rectangular plate, guide means on said plate, and forming an extension of the plate, a shutter extending along one edge of said plate, means pivotally mounting the shutter on the plate for tilting movement relative to the plate to frame an elongated aperture with the edge of the plate, and trigger means engageable with the shutter to swing said shutter on said pivotal mounting away from the edge of the plate, and spring means engaging the shutter to return said shutter to engagement with said one edge of said plate.

4. A reading training device comprising a rectangular plate, guide means on said plate engageable with the side of a book on which the device is used, including a T-square mounted on the plate, a shutter extending along one edge of said plate, and forming an extension of the plate, the T-square being arranged at a right angle to said one edge of said plate, means pivotally mounting the shutter on the plate, and trigger means engageable with the shutter to swing said shutter on said pivotal mounting away from the edge of the plate, and spring means engaging the shutter to return said shutter to engagement with said one edge of said plate.

5. A reading training device comprising a rectangular plate, guide means on said plate, including a pair of rollers journalled on said plate, a shutter extending along one edge of said plate and forming an extension of the plate, means pivotally mounting the shutter on the plate for tilting movement relative to the plate to frame an elongated aperture with the edge of the plate, and trigger means engageable with the shutter to swing said shutter on said pivotal mounting away from the edge of the plate, and spring means engaging the shutter to return said shutter to engagement with said one edge of said plate.

6. A reading training device comprising a rectangular plate, a shutter extending along one edge of said plate and forming an extension of the plate, means pivotally mounting said shutter on the plate for tilting movement relative to the plate to frame an elongated aperture with the edge of the plate, a manually operable trigger engaging said shutter spring means engaging the shutter to return said shutter to engagement with said one edge of said plate and including means releasing said trigger from the shutter after predetermined movement of the trigger, whereby said shutter is returned to engagement with said one edge of the plate.

7. A reading training device comprising a rectangular plate, a shutter extending along one edge of said plate and forming an extension of the plate, means pivotally mounting said shutter on the plate for tilting movement relative to the plate to frame an elongated aperture with the edge of the plate, and a trip finger projecting from said shutter, and spring means engaging the shutter to urge the same to engagement with said one edge of the plate.

8. A reading training device comprising a rectangular plate, a shutter extending along one edge of said plate and forming an extension of the plate, means pivotally mounting said shutter on the plate for tilting movement relative to the plate to frame an elongated aperture with the edge of the plate, and a trip finger projecting from said shutter, and spring means engaging the shutter to urge the same to engagement with said one edge of the plate, and guide means on said plate.

9. A reading training device comprising a rectangular plate, a shutter extending along one edge of said plate and forming an extension of the plate, means pivotally mounting said shutter on the plate for tilting movement relative to the plate to frame an elongated aperture with the edge of the plate, and a trip finger pivotally mounted adjacent said shutter, and spring means engaging the shutter to urge same to engagement with said one edge of the plate, and means releasably coupling said finger to said shutter.

10. A reading training device comprising a rectangular plate, a shutter extending along one edge of said plate and forming an extension of the plate, means pivotally mounting said shutter on the plate for tilting movement relative to the plate to frame an elongated aperture with the edge of the plate, and a trip finger pivotally mounted adjacent said shutter, and spring means engaging the shutter to urge same to engagement with said one edge of the plate, guide means mounted on said plate, and means releasably coupling said finger to said shutter.

References Cited in the file of this patent

UNITED STATES PATENTS

| | | |
|---|---|---|
| 647,899 | McCloskey | Apr. 17, 1900 |
| 1,435,375 | Brown | Nov. 14, 1922 |
| 1,587,886 | Whitmore | June 8, 1926 |
| 1,847,815 | Church | Mar. 1, 1932 |
| 2,265,924 | Oerter | Dec. 9, 1941 |
| 2,266,798 | Peck | Dec. 23, 1941 |
| 2,340,969 | Lister | Feb. 8, 1944 |

FOREIGN PATENTS

| | | |
|---|---|---|
| 508,570 | Great Britain | Sept. 28, 1937 |